United States Patent
Eto et al.

(10) Patent No.: US 10,730,438 B2
(45) Date of Patent: Aug. 4, 2020

(54) VEHICLE DOOR MIRROR INCLUDING VIBRATION SUPPRESSING SUPPORT

(71) Applicant: KABUSHIKI KAISHA HONDA LOCK, Miyazaki-shi, Miyazaki (JP)

(72) Inventors: Yasuyuki Eto, Miyazaki (JP); Satoshi Jin, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 15/541,940

(22) PCT Filed: Jan. 8, 2016

(86) PCT No.: PCT/JP2016/050464
§ 371 (c)(1),
(2) Date: Jul. 6, 2017

(87) PCT Pub. No.: WO2016/117388
PCT Pub. Date: Jul. 28, 2016

(65) Prior Publication Data
US 2017/0368996 A1 Dec. 28, 2017

(30) Foreign Application Priority Data

Jan. 23, 2015 (JP) .................................. 2015-010914

(51) Int. Cl.
*G02B 5/08* (2006.01)
*B60R 1/076* (2006.01)
(Continued)

(52) U.S. Cl.
CPC .............. *B60R 1/076* (2013.01); *B60R 1/074* (2013.01); *F16F 1/373* (2013.01); *F16F 1/377* (2013.01); *F16F 15/08* (2013.01)

(58) Field of Classification Search
CPC ......... B60R 1/076; B60R 1/12; B60R 1/1207; B60R 1/074; B60R 1/06; F16F 15/08;
(Continued)

(56) References Cited

U.S. PATENT DOCUMENTS 6,501,387 B2 * 12/2002 Skiver ...................... B60R 1/12
340/815.4
6,682,200 B2 1/2004 Tsuyama et al.
(Continued)

FOREIGN PATENT DOCUMENTS

CN 1410296 A 4/2003
CN 1872587 A 12/2006
(Continued)

OTHER PUBLICATIONS

Official Communication, Decision of Granting a Patent, dated Jul. 4, 2018, issued in the corresponding Japanese Patent Application 2015-010914.
(Continued)

*Primary Examiner* — Stephone B Allen
*Assistant Examiner* — Jyotsna V Dabbi
(74) *Attorney, Agent, or Firm* — Carrier Blackman & Associates, P.C.; Joseph P. Carrier; William D. Blackman

(57) ABSTRACT

A vehicle door mirror includes a base member mounted on a side door while having plural mounting holes and plural insertion holes coaxially communicating with the mounting holes, and a mirror housing pivotably supported on a support shaft which has a plurality of bosses, each boss having a tubular portion and ribs extending along an axial direction of the tubular portion. Screw members are inserted through respective ones of the insertion holes and screwed into the tubular portions of the bosses respectively inserted into the mounting holes so that the ribs of each boss abut against an inner peripheral face of the corresponding mounting hole.
(Continued)

The ribs are projectingly provided on the outer peripheral face, at least on a base part side, of the corresponding tubular portion. Such arrangement suppresses vibration of the mirror even when the support shaft is made of a synthetic resin.

8 Claims, 9 Drawing Sheets

(51) Int. Cl.
*F16F 15/08* (2006.01)
*B60R 1/074* (2006.01)
*F16F 1/373* (2006.01)
*F16F 1/377* (2006.01)

(58) Field of Classification Search
CPC .. F16F 1/373; F16F 1/377; B60Q 1/26; B60Q 1/2665; F16M 13/022; G02B 7/182; H01Q 1/3206; H01Q 1/32
USPC ......... 359/841, 871, 872; 343/713; 248/479, 248/472
See application file for complete search history.

(56) References Cited

U.S. PATENT DOCUMENTS

| | | | |
|---|---|---|---|
| 7,144,125 B2 * | 12/2006 | Shinohara | ................ B60R 1/06 359/871 |
| 7,669,275 B2 | 3/2010 | Yagi | |
| 8,800,950 B2 | 8/2014 | Kawanishi | |

FOREIGN PATENT DOCUMENTS

| | | | | |
|---|---|---|---|---|
| JP | H10-93259 A | | 4/1998 | |
| JP | 2009-208629 A | | 9/2009 | |
| JP | 2009208629 A | * | 9/2009 | ............. B60R 1/072 |
| JP | 2009-298375 A | | 12/2009 | |
| JP | 2011-002392 A | | 1/2011 | |
| JP | 2012-126222 A | | 7/2012 | |
| JP | 2012-201199 A | | 10/2012 | |
| JP | 2013-112203 A | | 6/2013 | |
| JP | 2013-123928 A | | 6/2013 | |
| JP | 2013123928 A | * | 6/2013 | ............... B60R 1/06 |

OTHER PUBLICATIONS

Official Communication issued in the corresponding patent application No. 201680004320.1 dated Nov. 5, 2018.

\* cited by examiner

VEHICLE DOOR MIRROR INCLUDING VIBRATION SUPPRESSING SUPPORT

TECHNICAL FIELD

The present invention relates to a vehicle door mirror that includes a mirror housing that has a mirror mounted thereon, a base member that is mounted on a side door while having a plurality of mounting holes and a plurality of insertion holes coaxially communicating with the mounting holes, and a support shaft that pivotably supports the mirror housing and has a plurality of bosses having a tubular portion and a rib extending along an axis of the tubular portion and being plurally projectingly provided on an outer periphery of the tubular portion, a screw member inserted through the insertion hole being screwed into the tubular portion of the boss inserted into the mounting hole so that the rib abuts against an inner peripheral face of the mounting hole.

BACKGROUND ART

A vehicle door mirror in which a mounting hole is provided in a base member mounted on a side door, a boss of a support shaft pivotably supporting a mirror housing is inserted through the mounting hole so that a plurality of ribs provided on the outer periphery of the boss abut against an inner peripheral face of the mounting hole, and the support shaft is fixed to the base member by the base member and the boss being fastened by means of a screw member is known from Patent Document 1.

RELATED ART DOCUMENTS

Patent Documents

Patent Document 1: Japanese Patent Application Laid-open No. 2013-123928

SUMMARY OF THE INVENTION

Problems to be Solved by the Invention

In the arrangement disclosed in Patent Document 1 above, in order to suppress vibration of the mirror housing, that is, the mirror, due to rattling between the support shaft and the base member, the rib provided on the outer periphery of the boss on the support shaft side is made to abut against the inner peripheral face of the mounting hole, but since the rib is provided only on the extremity side of the boss, when the support shaft is made of for example a synthetic resin, which has low stiffness compared with a metal, run-out of the support shaft becomes large, and the effect in suppressing vibration of the mirror is degraded.

The present invention has been accomplished in light of such circumstances, and it is an object thereof to provide a vehicle door mirror that can maintain an effect in suppressing vibration of a mirror even when a support shaft is made of a synthetic resin.

Means for Solving the Problems

In order to attain the above object, according to a first aspect of the present invention, there is provided a vehicle door mirror comprising a mirror housing that has a mirror mounted thereon, a base member that is mounted on a side door while having a plurality of mounting holes and a plurality of insertion holes coaxially communicating with the mounting holes, and a support shaft that pivotably supports the mirror housing and has a plurality of bosses having a tubular portion and a rib extending along an axis of the tubular portion and being plurally projectingly provided on an outer periphery of the tubular portion, a screw member inserted through the insertion hole being screwed into the tubular portion of the boss inserted into the mounting hole so that the rib abuts against an inner peripheral face of the mounting hole, characterized in that the rib is projectingly provided on the outer peripheral face, at least on a base part side, of the tubular portion.

Further, according to a second aspect of the present invention, in addition to the first aspect, the support shaft comprises first to third bosses, a pair of the ribs of the first boss are disposed so as to point in a vehicle fore-and-aft direction, a pair of the ribs of the second boss are disposed so as to point in a vehicle left-and-right direction, and a pair of the ribs of the third boss are disposed so as to point in a longitudinal direction of the mirror housing when in the raised position.

Effects of the Invention

In accordance with the first aspect of the present invention, the tubular parts of the plurality of bosses provided on the support shaft pivotably supporting the mirror housing are each inserted into the plurality of mounting holes provided in the base member mounted on the side door, the support shaft is fixed to the base member by screwing the screw members inserted into the insertion holes coaxially communicating with the mounting holes into the tubular parts, and since the plurality of ribs extending along the axis of the tubular part projectingly provided on the outer periphery, at least on the base part side, of the tubular part abut against the inner peripheral face of the mounting hole, even when the support shaft is formed from for example a synthetic resin, which has a low stiffness compared with a metal, it is possible to suppress effectively run-out of the support shaft, that is, the mirror, thus giving an excellent effect in suppressing vibration and thereby enhancing the visibility of the mirror.

Furthermore, in accordance with the second aspect of the present invention, since the ribs of the first to third bosses face in the vehicle fore-and-aft direction, the vehicle left-and-right direction, and the longitudinal direction of the mirror housing in the raised position, it is possible to suppress run-out of the support shaft in the vehicle fore-and-aft direction, the vehicle left-and-right direction, and the longitudinal direction of the mirror housing when the mirror housing is in the raised position, thus enhancing the visibility of the mirror.

EXPLANATION OF REFERENCE NUMERALS AND SYMBOLS

Figure 1:
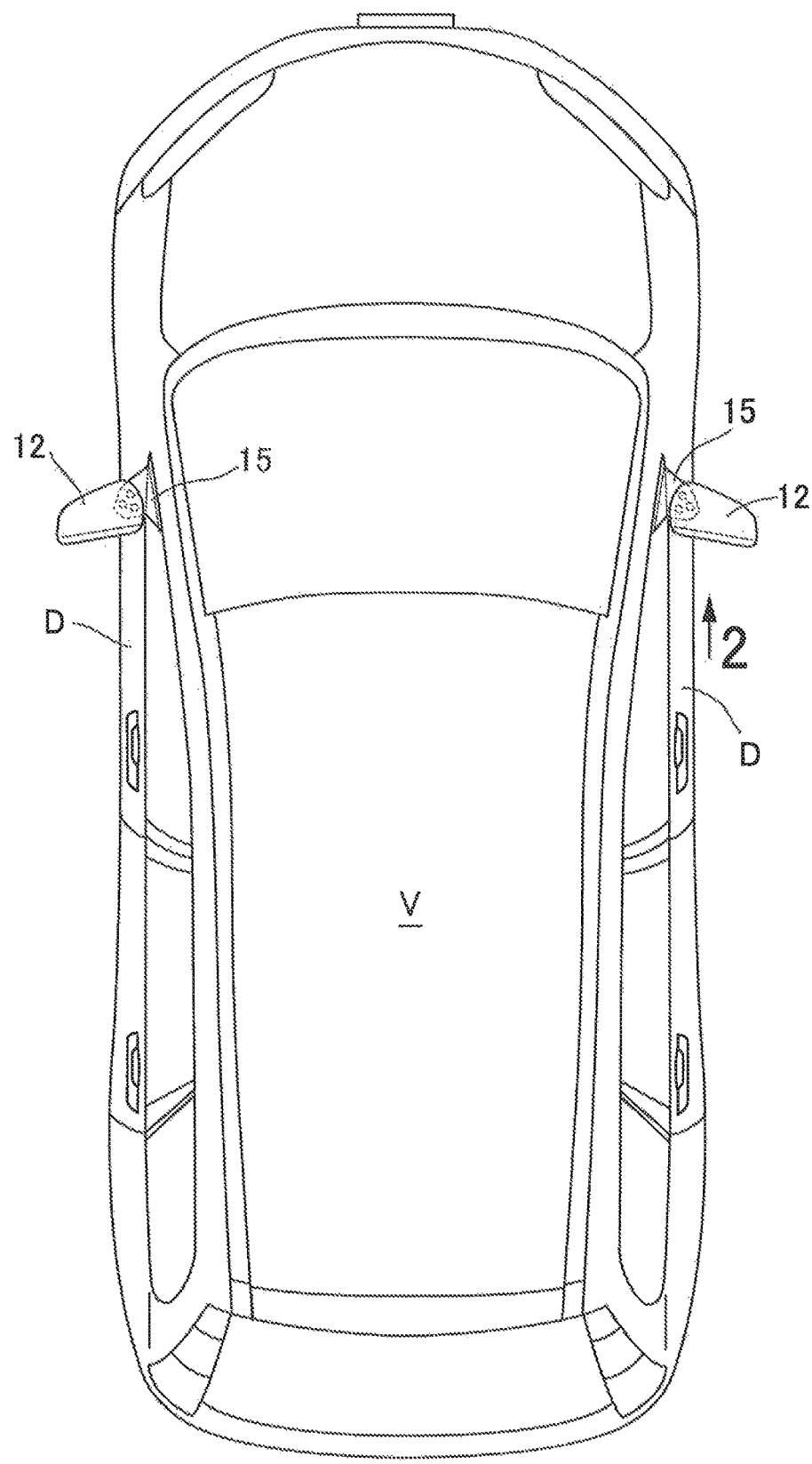
FIG. 1 is a plan view of a four-wheel vehicle. (first embodiment)

11 Mirror
12 Mirror housing
13 Inner base, which is a base member
18 Support shaft
41, 42, 43 Boss
41a, 42a, 43a Tubular portion
41b, 42b, 43b Rib
44, 45, 46 Mounting hole
47, 48, 49 Insertion hole
51 Vehicle fore-and-aft direction
52 Vehicle left-and-right direction
53 Longitudinal direction of mirror housing in raised position
57, 58, 59 Screw member
D Side door

MODES FOR CARRYING OUT THE INVENTION

An embodiment of the present invention is explained below by reference to the attached FIG. 1 to FIG. 9.

First Embodiment

Figure 2:
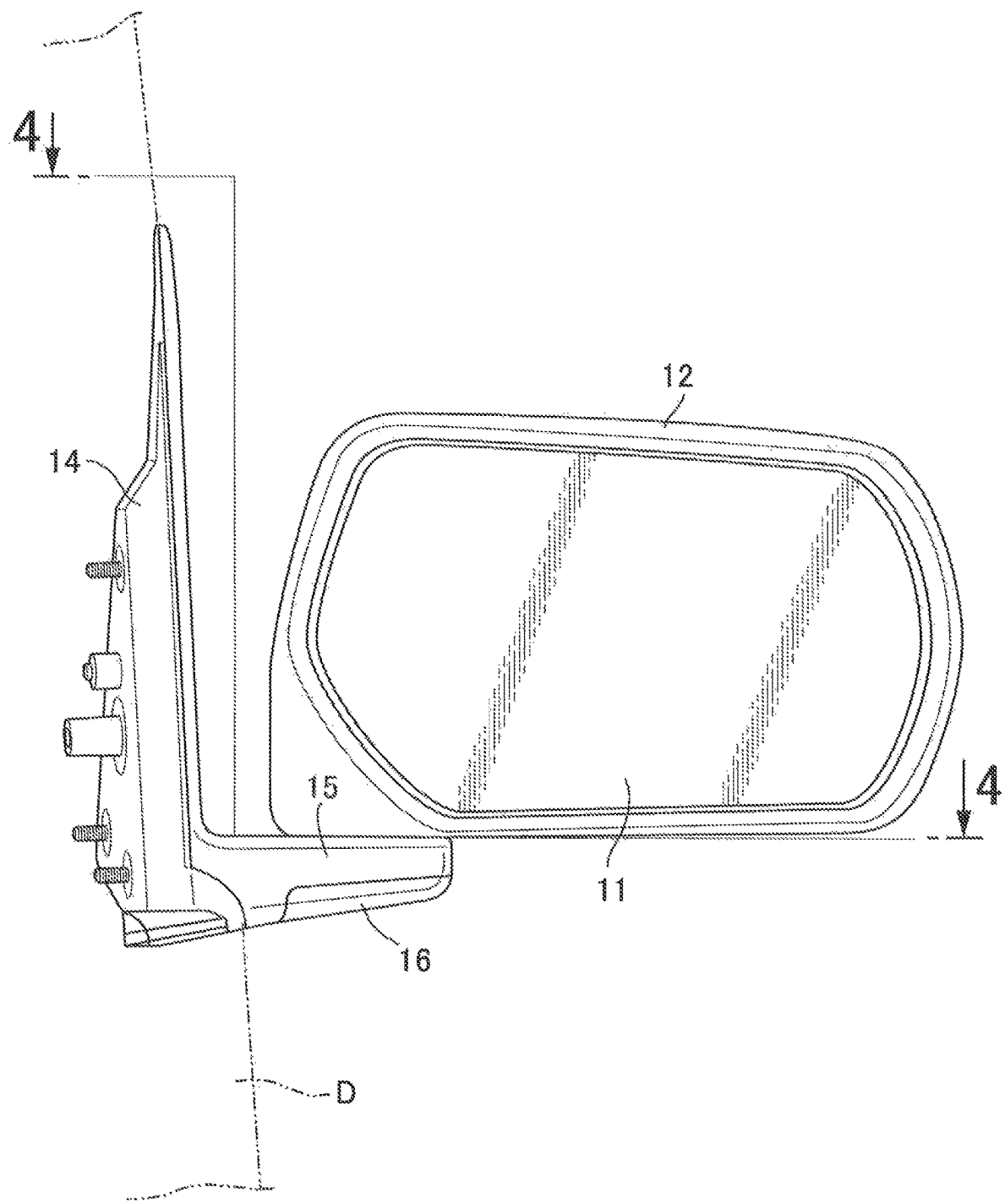
FIG. 2 is a view in the direction of arrow 2 in FIG. 1. (first embodiment)

First, in FIG. 1 and FIG. 2, a mirror housing 12 having a mirror 11 mounted thereon is disposed on left and right front side doors D of a passenger vehicle V, the mirror housing 12 being capable of pivoting between a raised position in which it projects sideways from the front side door D and a retracted position in which it is retracted to the front side door D side.

Figure 3:
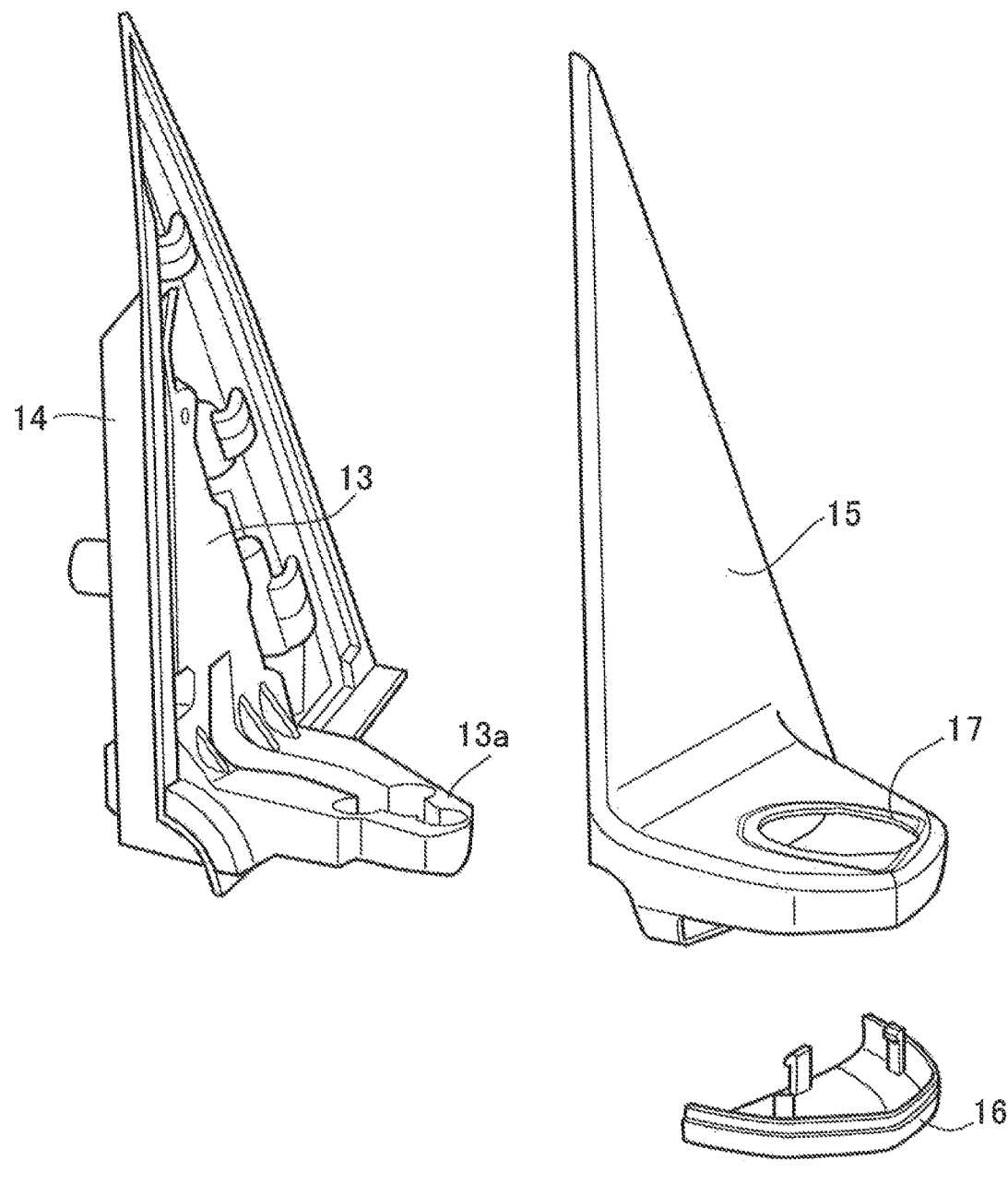
FIG. 3 is an exploded perspective view of an inner base, a first base cover and a second base cover. (first embodiment)
Figure 4:
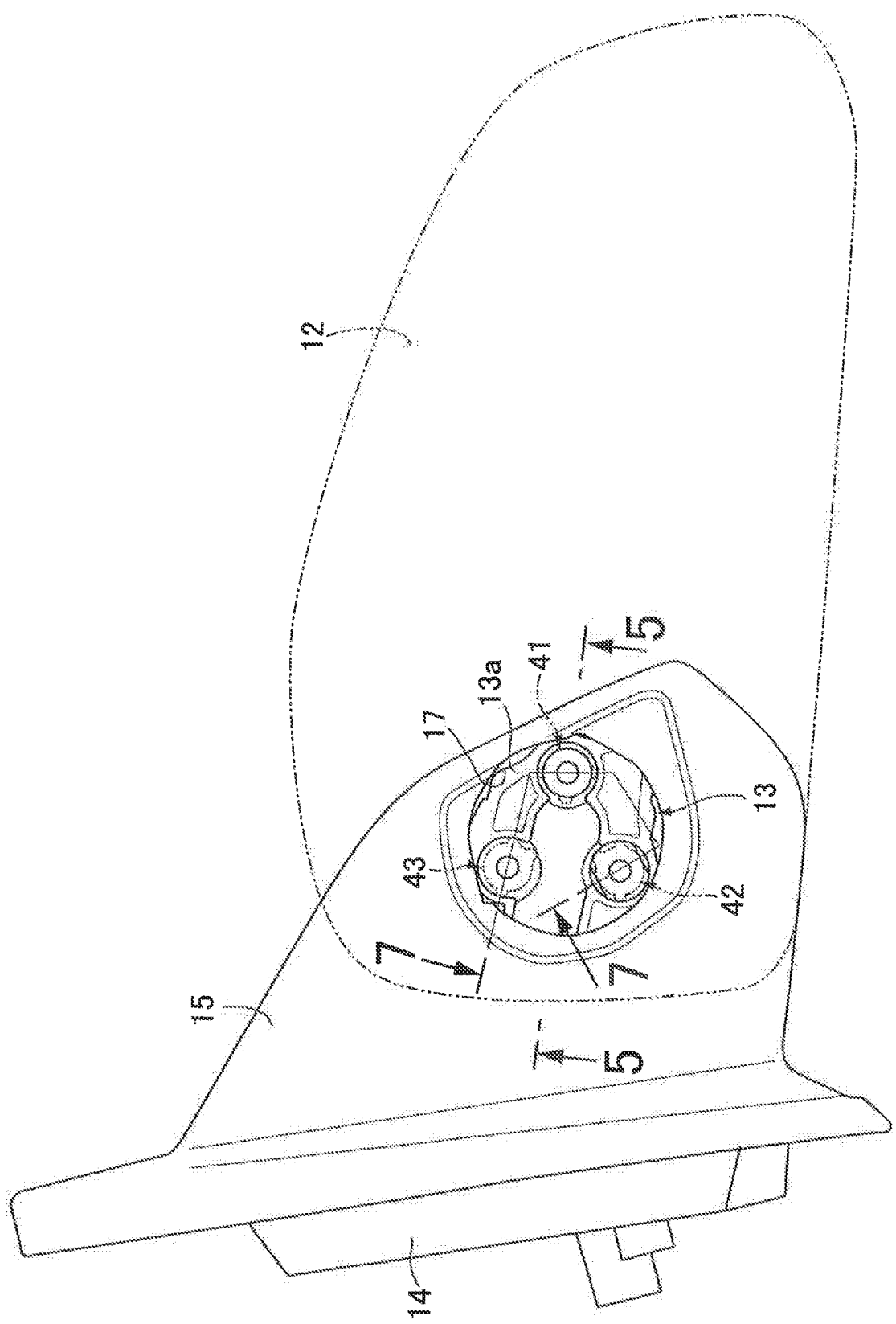
FIG. 4 is a view from arrowed line 4-4 in FIG. 2. (first embodiment)

Referring in addition to FIG. 3 and FIG. 4, an inner base 13 as a base member die-molded from a light metal is mounted on the front side door D so as to sandwich a rubber seat base 14 between itself and the front side door D, and the mirror housing 12 is pivotably supported on a door mirror support portion 13a provided integrally with the inner base 13 at a position spaced outward from the front side door D.

Apart from the door mirror support portion 13a, the inner base 13 is covered with first and second base covers 15 and 16 made of a synthetic resin. The first base cover 15 is formed into a shape that covers the inner base 13 from the outside, from below and from above while having an opening 17 through which the mirror support portion 13a faces upward. The second base cover 16 is provided so as to be connected to a lower part of the first base cover 15 so as to cover the door mirror support portion 13a from below.

Figure 5:
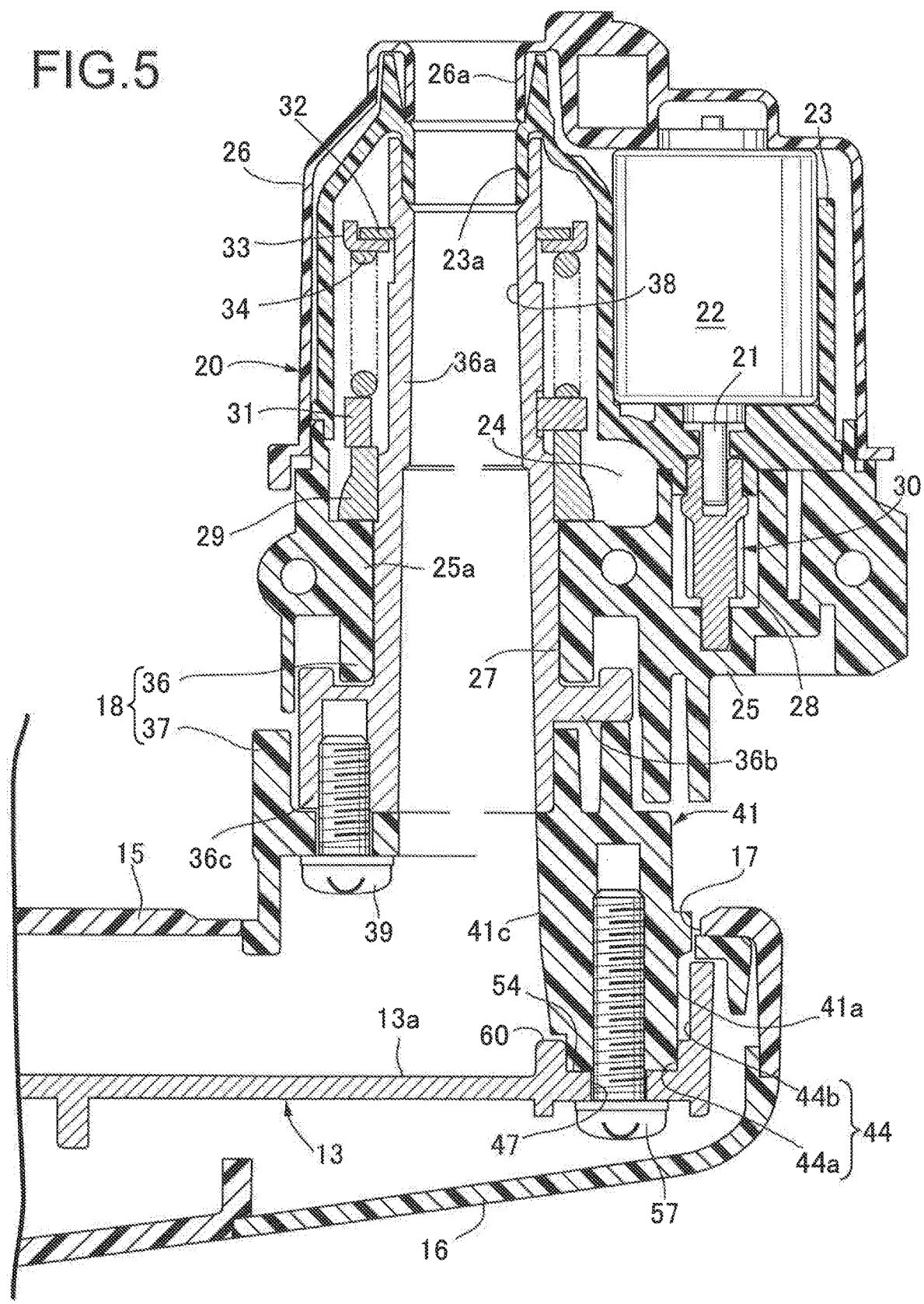
FIG. 5 is a sectional view along line 5-5 in FIG. 4 showing the vicinity of a support shaft. (first embodiment)

In FIG. 5 an electric retraction unit 20 is fixedly housed within the mirror housing 12, this electric retraction unit 20 being pivotably supported on a support shaft 18 fixed to the mirror support portion 13a of the inner base 13.

The electric retraction unit 20 is formed by joining to each other a motor case 23 that houses part of an electric motor 22 having a rotational axis parallel to a shaft portion 36a of the support shaft 18 and supports the electric motor 22, a gear case 25 forming a gear chamber 24 between itself and the motor case 23 and joined to the motor case 23 from below, and a cover 26 that covers the motor case 23 as well as the electric motor 22.

A first bearing portion 25a is formed on a lower part of the gear case 25 so as to be pivotably supported by the shaft portion 36a, the first bearing portion 25a having a through hole 27 through which the shaft portion 36a of the support shaft 18 extends. A cylindrical second bearing portion 23a is formed integrally with the motor case 23, the cylindrical second bearing portion 23a being fitted into an upper end part of the shaft portion 36a so as to be pivotably supported by the upper end part of the shaft portion 36a. Furthermore, a cylindrical portion 26a is formed integrally with the cover 26, the cylindrical portion 26a being fitted into an upper part of the motor case 23 so as to coaxially communicate with the upper end of the shaft portion 36a.

A drive gear mechanism 30 is housed within the gear chamber 24. The drive gear mechanism 30 has a worm gear 28 coaxially and relatively non-rotatably linked to an output shaft 21 of the electric motor 22, a gear train (not illustrated) transmitting rotational power from the worm gear 28, and a clutch gear 29 to which the power is transmitted from the gear train, the clutch gear 29 being rotatably fitted onto the shaft portion 36a of the support shaft 18 while abutting against the first bearing portion 25a.

A clutch plate 31 sandwiching the clutch gear 29 between itself and the first bearing portion 25a is non-rotatably but axially movably fitted around the shaft portion 36a, and a coil-shaped clutch spring 34 is provided in a compressed state between the clutch plate 31 and a retainer 33 that is received by a retaining ring 32 fitted around the shaft portion 36a at a position close to the second bearing portion 23a.

In a state in which an external force of a predetermined value or greater is not acting on the mirror housing 12, the clutch gear 29 is prevented from rotating around the axis of the shaft portion 36a by being held between the first bearing portion 25a and the clutch plate 31, and if the electric motor 22 operates in this state, the electric retraction unit 20, that is, the mirror housing 12, pivots around the axis of the shaft portion 36a between a retracted position in which it is retracted to the front side door D side and a raised position in which it projects sideways from the front side door D.

On the other hand, when an external force of a predetermined value or greater acts on the mirror housing 12, the clutch gear 29 can pivot around the axis of the shaft portion 36a between a rearward inclined position and a forward inclined position while slipping between the first bearing portion 25a and the clutch plate 31, thus enabling the mirror housing 12 to be manually pivoted or the mirror housing 12 to be pivoted by the impact of contact with another obstacle. In this embodiment, the rearward inclined position is set at the same position as the retracted position, and the forward inclined position is set at a position that is pivoted further forward than the raised position.

The support shaft 18 is formed from a shaft member 36 formed from a light alloy such as a zinc alloy, and a mounting member 37 made of a synthetic resin and fastened to a lower end part of the shaft member 36, the mounting member 37 being fixed to the mirror support portion 13a of the inner base 13.

The shaft member 36 integrally has the shaft portion 36a, which is cylindrical, has a center hole 38, and extends in the vertical direction, a collar portion 36b protruding sideways from a lower part of the shaft portion 36a, and a cylindrical mounting boss portion 36c projecting downward so as to be connected to the lower end part of the shaft portion 36a and the collar portion 36b at three positions spaced at an equal interval in the peripheral direction of the shaft portion 36a.

Figure 6:
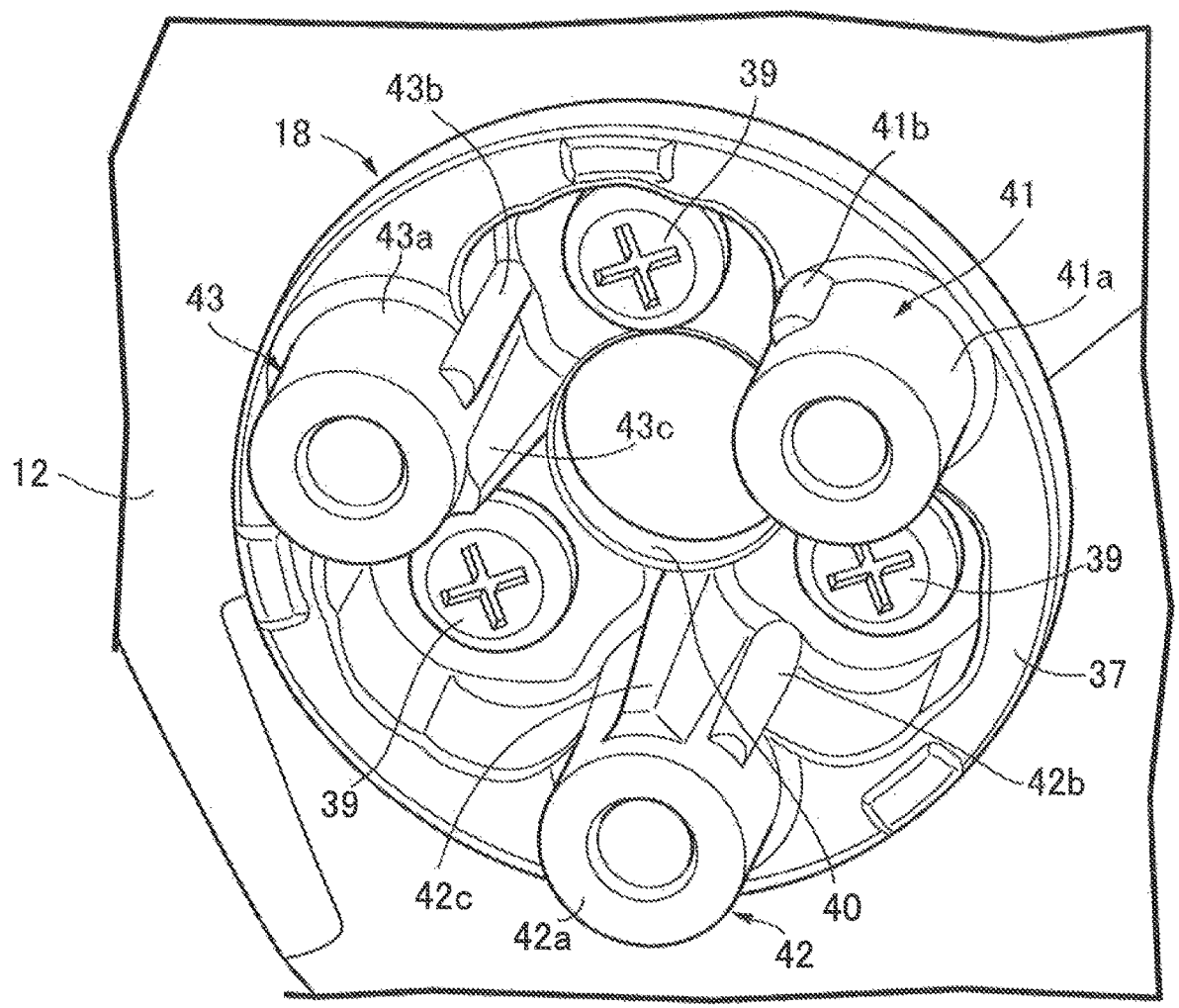
FIG. 6 is a perspective view of a mirror housing and the support shaft from below. (first embodiment)

Referring in addition to FIG. 6, the mounting member 37 is formed so as to be fastened to the mounting boss portion 36c by means of screw members 39 while opposing the collar portion 36b of the shaft member 36 from below and so as to face the mirror support portion 13a side from a lower part of the mirror housing 12. A center hole 40 communicating with the center hole 38 is provided in the mounting member 37, and a plurality of bosses 41, 42 and 43 projecting toward the mirror support portion 13a side so as to be disposed between the three mounting boss portions 36c are projectingly provided integrally with the mounting member 37, and in this embodiment first, second and third bosses 41, 42 and 43 are provided integrally with the mounting member 37.

Figure 7:
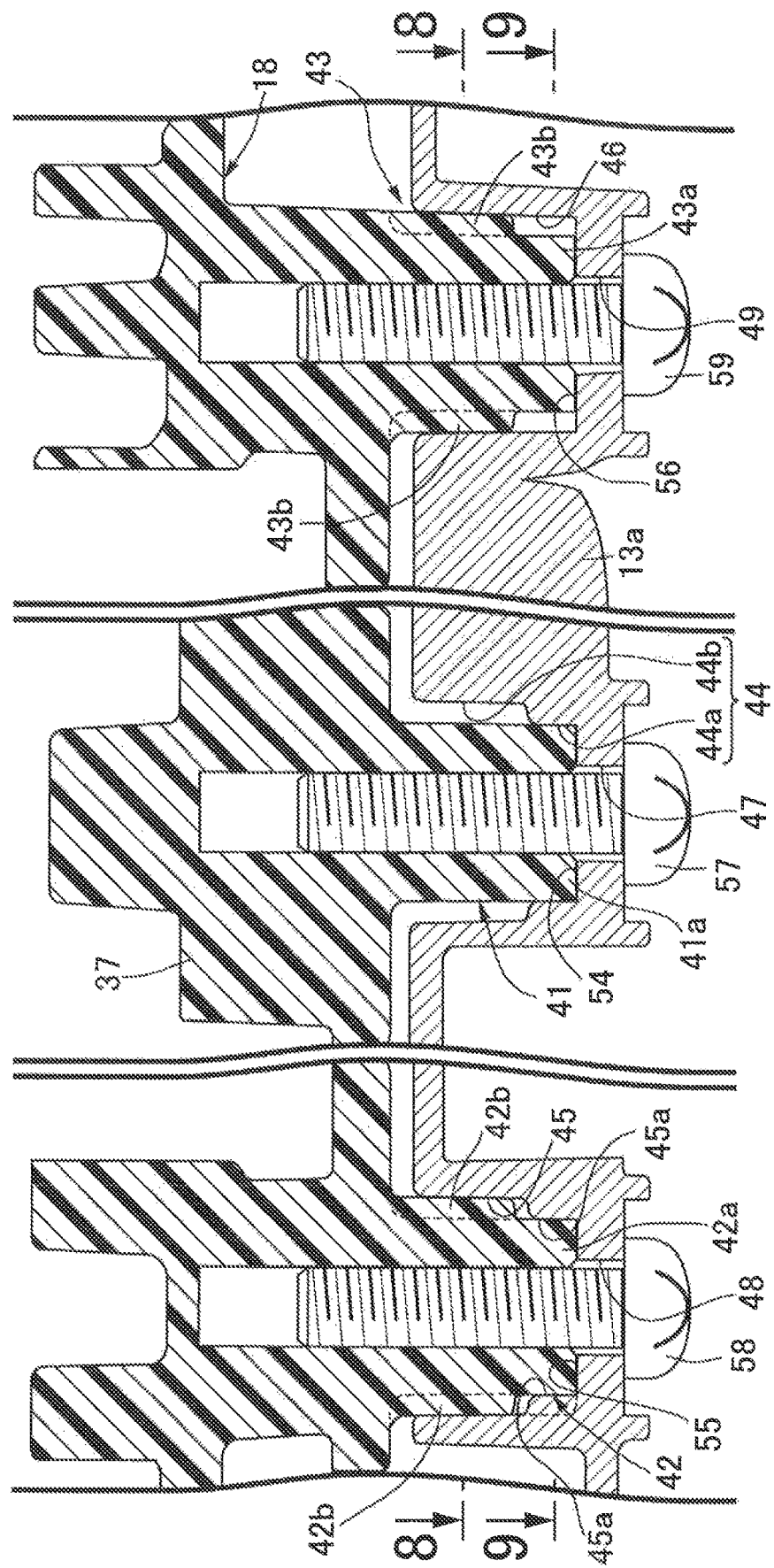
FIG. 7 is a sectional view along line 7-7 in FIG. 4. (first embodiment)
Figure 8:
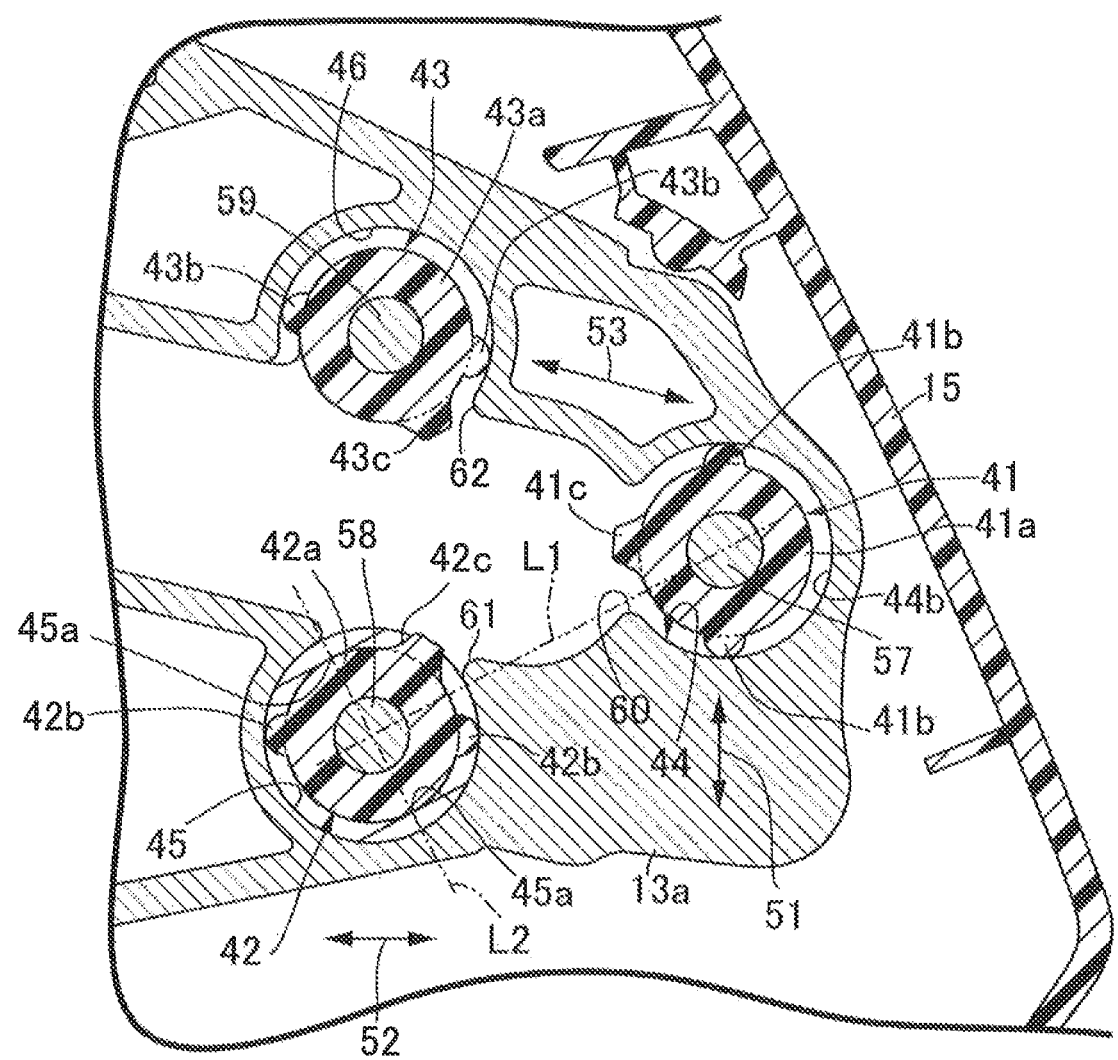
FIG. 8 is a sectional view along line 8-8 in FIG. 7. (first embodiment)
Figure 9:
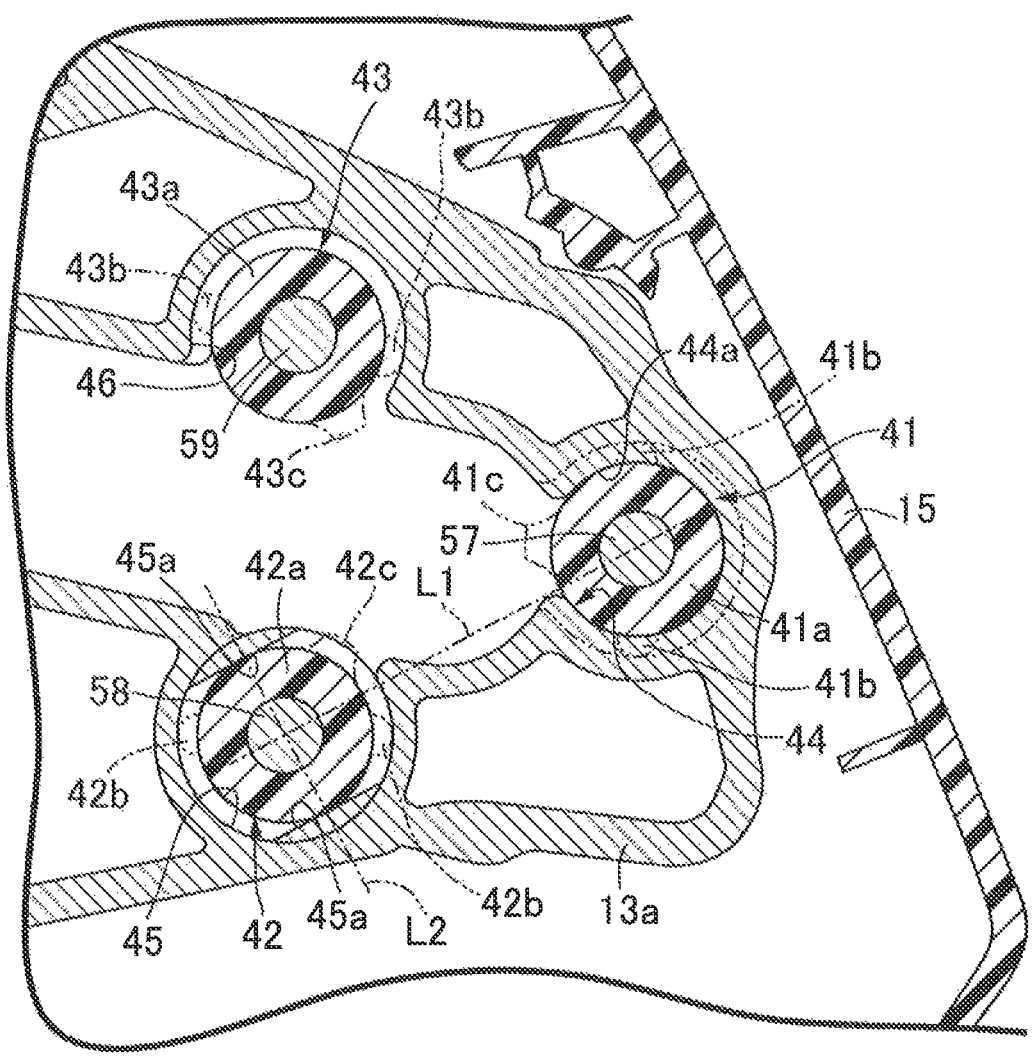
FIG. 9 is a sectional view along line 9-9 in FIG. 7. (first embodiment)

Referring in addition to FIG. 7 to FIG. 9, a plurality of mounting holes and a plurality of insertion holes coaxially communicating with the mounting holes are provided in the mirror support portion 13a of the inner base 13, and in this embodiment first to third mounting holes 44, 45 and 46 individually corresponding to the first to third bosses 41 to 43 and first, second and third insertion holes 47, 48 and 49 coaxially communicating with the first to third mounting holes 44, 45 and 46 are provided in the mirror support portion 13a.

The first to third bosses 41 to 43 are disposed on the periphery of the center hole 40 at intervals in the peripheral direction of the center hole 40, and are formed so as to integrally have cylindrical tubular portions 41a, 42a and 43a connected integrally to the mounting member 37 and projecting toward the mirror support portion 13a side while having an axis parallel to the axis of the shaft portion 36a, ribs 41b, 42b and 43b extending in a direction along the axis of the tubular portions 41a to 43a and being plurally projectingly provided on the outer periphery of the tubular portion 41a to 43a, and reinforcing ribs 41c, 42c and 43c extending in a direction along the axis of the tubular portions 41a to 43a, one being projectingly provided on the outer periphery of each of the tubular portions 41a to 43a.

The ribs 41b to 43b are projectingly provided on an outer peripheral face on at least the base part side of the tubular portions 41a to 43a, and in this embodiment the ribs 41b to 43b are disposed in a section from the base part of the tubular portion 41a to 43a to an intermediate part in the axial direction of the tubular portion 41a to 43a.

Furthermore, in this embodiment the ribs 41b, 42b and 43b are projectingly provided in pairs on one diameter of each of the tubular portions 41a to 43a on the outer periphery of the tubular portions 41a to 43a and, moreover, the rib 41b of the first boss 41 is disposed so as to point in a vehicle fore-and-aft direction 51, the rib 42b of the second boss 42 is disposed so as to point in a vehicle left-and-right direction 52, and the rib 43b of the third boss 43 is disposed so as to point in a longitudinal direction 53 of the mirror housing 12 when the mirror housing 12 is at a raised position in which it projects sideways from the front side door D.

The first mounting hole 44, into which the first boss 41 is inserted, is formed from a small diameter hole portion 44a into which an extremity part of the tubular portion 41a of the first boss 41 is fitted, and a large diameter hole portion 44b formed so as to have a larger diameter than the small diameter hole portion 44a and coaxially communicating with an end part on the support shaft 18 side of the small diameter hole portion 44a. The first insertion hole 47 coaxially communicates with an end part, on the side opposite to the large diameter hole portion 44b, of the small diameter hole portion 44a so as to form an annular step part 54 between itself and the small diameter hole portion 44a.

An extremity part of the tubular portion 41a of the first boss 41 is fitted into the small diameter hole portion 44a of the first mounting hole 44 so as to abut against the annular step part 54, the rib 41b of the first boss 41 abuts against an inner peripheral face of the large diameter hole portion 44b of the first mounting hole 44, and inserting a screw member 57 through the first insertion hole 47 and screwing it into the tubular portion 41a and tightening fixes the first boss 41 to the mirror support portion 13a of the inner base 13.

The second mounting hole 45, into which the second boss 42 is inserted, is formed so as to have a larger diameter than the tubular portion 42a of the second boss 42, an annular step part 55 is formed between the second mounting hole 45 and the second insertion hole 48, and a pair of abutment faces 45a abutting from opposite sides against the outer periphery of an extremity part of the tubular portion 42a inserted into the second mounting hole 45 are formed on an inner peripheral face, close to the annular step part 55, of the second mounting hole 45.

The abutment face 45a prevents the second boss 41 from pivoting around the central axis of the first boss 41 while enabling the second boss 42 to be inserted into the second mounting hole 45 even when there is dimensional tolerance between the central axes of the first and second bosses 41 and 42 by allowing for the dimensional tolerance, and is formed as a flat face orthogonal to a second straight line L2 that is orthogonal to a first straight line L1 passing through the central axes of the first and second mounting holes 44 and 45 and that passes through the central axis of the second mounting hole 45.

The second boss 42 is inserted into the second mounting hole 45 so that its extremity abuts against the annular step part 55 while the abutment faces 45a abut against the outer periphery of the extremity part of the tubular portion 42a from opposite sides, the rib 42b of the second boss 42 abuts against an inner peripheral face of the second mounting hole 45, and inserting a screw member 58 through the second insertion hole 48 and screwing it into the tubular portion 42a and tightening fixes the second boss 42 to the mirror support portion 13a of the inner base 13.

The third mounting hole 46, into which the third boss 43 is inserted, is formed so as to have a larger diameter than that of the tubular portion 43a of the third boss 43, and an annular step part 56 is formed between the third mounting hole 46 and the third insertion hole 49.

The third boss 43 is inserted into the third mounting hole 46 so that the extremity of the tubular portion 43a abuts against the annular step part 56, the rib 43b of the third boss 43 abuts against an inner peripheral face of the third mounting hole 46, and inserting a screw member 59 through the third insertion hole 49 and screwing it into the tubular portion 43a and tightening fixes the third boss 43 to the mirror support portion 13a of the inner base 13.

The reinforcing ribs 41c, 42c and 43c of the first to third bosses 41 to 43 are disposed so as to project from the tubular portions 41a, 42a and 43a toward the center side of the center hole 40, and cutouts 60, 61 and 62, which are formed by cutting out part in the peripheral direction of the first to third mounting holes 44 to 46, are formed in the mirror support portion 13a so as to enable the reinforcing ribs 41c, 42c and 43c to be disposed.

The operation of this embodiment is now explained. The mirror support portion 13 of the inner base 13a mounted on the front side door D is provided with the first to third mounting holes 44 to 46 and the first to third insertion holes 47 to 49 coaxially communicating with the mounting holes 44 to 46. The support shaft 18 pivotally supporting the mirror housing 12 is provided with the first to third bosses 41 to 43, a pair of the ribs 41b to 43b extending along the axes of each of the tubular portions 41a to 43a being projectingly provided on the outer periphery of the tubular portions 41a to 43a. The screw members 57 to 59 inserted through the first to third insertion holes 47 to 49 are screwed into the tubular portions 41a to 43a of the first to third bosses 41 to 43 inserted into the first to third mounting holes 44 to 46 so that the ribs 41b to 43b abut against the inner peripheral faces of the first to third mounting holes 44 to 46. Since the ribs 41b to 43b are projectingly provided on the outer peripheral faces, at least on the base part side, of the tubular portions 41a to 43a, even when the mounting member 37 forming part of the support shaft 18 is formed from a synthetic resin, which has a low stiffness compared with a metal, it is possible to suppress effectively run-out of the support shaft 18, that is, the mirror 11, thus giving an excellent effect in suppressing vibration and thereby enhancing the visibility of the mirror 11.

Furthermore, since, among the first to third bosses 41 to 43 of the support shaft 18, the pair of ribs 41b of the first boss 41 are disposed so as to point in the vehicle fore-and-aft direction 51, the pair of ribs 42b of the second boss 42 are disposed so as to point in the vehicle left-and-right direction 52, and the pair of ribs 43b of the third boss 43 are disposed so as to point in the longitudinal direction 53 of the mirror housing 12 when in the raised position, it is possible to suppress run-out of the support shaft 18 in the vehicle fore-and-aft direction 51, the vehicle left-and-right direction 52, and the longitudinal direction 53 of the mirror housing 12 when the mirror housing 12 is in the raised position, thus enhancing the visibility of the mirror 11.

An embodiment of the present invention is explained above, but the present invention is not limited to the above embodiment and may be modified in a variety of ways as long as the modifications do not depart from the spirit and scope thereof.

For example, in the above embodiment, the support shaft 18 is formed by joining the shaft member 36 and the mounting member 37, which are separate members from each other, but the present invention may be applied to a case in which a support shaft that is a single member is used.

The invention claimed is:

1. A vehicle door mirror comprising:
a mirror housing that has a mirror mounted thereon,
a base member that is mounted on a side door while having a plurality of boss mounting holes and a plurality of screw member insertion holes coaxially communicating with the boss mounting holes,
a support shaft that pivotally supports the mirror housing and has a mounting member with a plurality of bosses which are respectively received in the boss mounting holes, each of the bosses having a tubular portion and ribs extending along an axial direction of the tubular portion and projectingly provided on an outer periphery of the tubular portion, and
screw members respectively inserted through the screw member insertion holes being respectively screwed into the tubular portions of the bosses received in the boss mounting holes so that the ribs of each boss abut against an inner peripheral face of the associated boss mounting hole,
wherein the ribs of each said boss are projectingly provided on the outer periphery, at least on a base part of the tubular portion of the boss, the base part of the tubular portion of the boss being connected integrally to the mounting member of the support shaft and projecting away from the mounting member toward the base member, and portions of the ribs at the base part of the tubular portion of the boss engage an inner peripheral surface of the associated boss mounting hole, and
wherein each of the ribs engages the inner peripheral surface of the associated mounting hole along substantially an entire longitudinal length of the rib and only partially along a longitudinal length of the associated mounting hole.

2. The vehicle door mirror according to claim 1, wherein the support shaft comprises first to third bosses,
a pair of the ribs of the first boss are disposed so as to project in a vehicle fore-and-aft direction, a pair of the ribs of the second boss are disposed so as to project in a vehicle left-and-right direction, and a pair of the ribs of the third boss are disposed so as to project in a longitudinal direction of the mirror housing when the mirror housing is in a raised position thereof projecting away from the side door.

3. The vehicle door mirror according to claim 2, wherein the pair of ribs of the first boss are disposed on opposite sides of the first boss, the pair of ribs of the second boss are disposed on opposite sides of the second boss and the pair of ribs of the third boss are disposed on opposite sides of the third boss.

4. The vehicle door mirror according to claim 1, wherein the boss mounting holes and the bosses are substantially cylindrical in shape.

5. The vehicle door mirror according to claim 1, wherein each of the boss mounting holes includes a smaller diameter portion and a larger diameter portion with an annular step part therebetween.

6. The vehicle door mirror according to claim 5, wherein:
each of the tubular portions also has an extremity part extending away from the base part, the extremity part is received in the smaller diameter portion of the associated boss mounting hole so as to abut against the annular step part of the associated boss mounting hole, and the ribs of the tubular portion abut against the inner peripheral face of the larger diameter portion of the associated boss mounting hole.

7. The vehicle door mirror according to claim 1, wherein each of the bosses also has a reinforcing rib which extends along the axial direction of the tubular portion of the boss and projects from the outer periphery of the tubular portion toward a center hole defined in the mirror housing, and a structure of the reinforcing rib is different from a structure of the other said ribs of the boss.

8. The vehicle door mirror according to claim 1, wherein each of the ribs extends from the base part to an intermediate part of the associated tubular portion in the axial direction of the tubular portion.

* * * * *